US011032669B2

(12) United States Patent
Baird et al.

(10) Patent No.: US 11,032,669 B2
(45) Date of Patent: Jun. 8, 2021

(54) MULTI-BLUETOOTH LISTENERS WITH AUTHENTICATED LEVELS AND POWER ADJUSTMENT

(71) Applicant: T-Mobile USA, Inc., Bellevue, WA (US)

(72) Inventors: Joseph Baird, Bellevue, WA (US); Nicholas LaVassar, Issaquah, WA (US); Christopher Moore, North Bend, WA (US); Parag Garg, Woodinville, WA (US); Deepti Busireddy, Bellevue, WA (US); Manish Singh, Issaquah, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 123 days.

(21) Appl. No.: 16/248,331

(22) Filed: Jan. 15, 2019

(65) Prior Publication Data

US 2020/0228925 A1 Jul. 16, 2020

(51) Int. Cl.
*H04W 4/029* (2018.01)
*H04W 76/14* (2018.01)
*G08B 21/24* (2006.01)

(52) U.S. Cl.
CPC ............ *H04W 4/029* (2018.02); *G08B 21/24* (2013.01); *H04W 76/14* (2018.02)

(58) Field of Classification Search
CPC ....... H04W 4/029; H04W 76/14; G08B 21/24
See application file for complete search history.

(56) References Cited

U.S. PATENT DOCUMENTS

| 8,847,754 | B2 * | 9/2014 | Buchheim | G01S 1/68 340/539.13 |
| 2004/0103282 | A1 * | 5/2004 | Meier | G06Q 20/3674 713/171 |
| 2008/0055155 | A1 * | 3/2008 | Hensley | A01K 11/008 342/357.31 |
| 2012/0322380 | A1 * | 12/2012 | Nannarone | G08B 13/1427 455/41.2 |
| 2017/0195339 | A1 * | 7/2017 | Brown | H04L 63/107 |
| 2018/0070559 | A1 * | 3/2018 | So | G01S 19/14 |
| 2020/0067607 | A1 * | 2/2020 | Peitzer | H04W 72/082 |

* cited by examiner

*Primary Examiner* — Brian A Zimmerman
*Assistant Examiner* — Kevin Lau
(74) *Attorney, Agent, or Firm* — Han Santos, PLLC

(57) ABSTRACT

Techniques are described herein for tracking an item of interest using a plurality of user equipment that can communicate with a tracking device that is configured to attach to the tracked item. The techniques include: storing a unique tracking device identifier corresponding to a tracking device associated with a first user equipment; receiving a location information of the tracking device from a second user equipment in response to the second user equipment receiving a tracking device signal transmitted by the tracking device, the tracking device signal comprising the location information of the tracking device and the unique tracking device identifier corresponding to the tracking device; authenticating the second user equipment to facilitate communication between the second user equipment and the tracking device; and transmitting the location information of the tracking device to the first user equipment.

20 Claims, 7 Drawing Sheets

MULTI-BLUETOOTH LISTENERS WITH AUTHENTICATED LEVELS AND POWER ADJUSTMENT

BACKGROUND

Various tracking systems can implement tracking devices such as Bluetooth® low energy (BLE) tracking devices to transmit signals to nearby user equipment. A tracking device can be removably attached to an item of interest to enable a user to locate the item by locating the tracking device. Generally, the tracking device can be paired with at least one user equipment such as a smartphone that enables a user to access a client application that can provide a location of the tracking device. Generally, the user equipment must be within the tracking device's communication range in order to receive signals from the tracking device. Accordingly, the user equipment cannot receive the tracking device's location information when it is located outside of the tracking device's communication range.

Further, the tracking device can have limited compatibility such that it can only be used to transmit its location information to paired a user equipment. More particularly, the tracking device can only be used with user equipment having a specific client application installed thereon. In this way, if a user equipment does not comprise the specific client application, it is inoperable to communicate with the tracking device to determine the tracking device's location information and operational status. As a result, the tracking device and the lost item may not be recovered even when the tracking device transmits signals to a network in an effort to be found.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
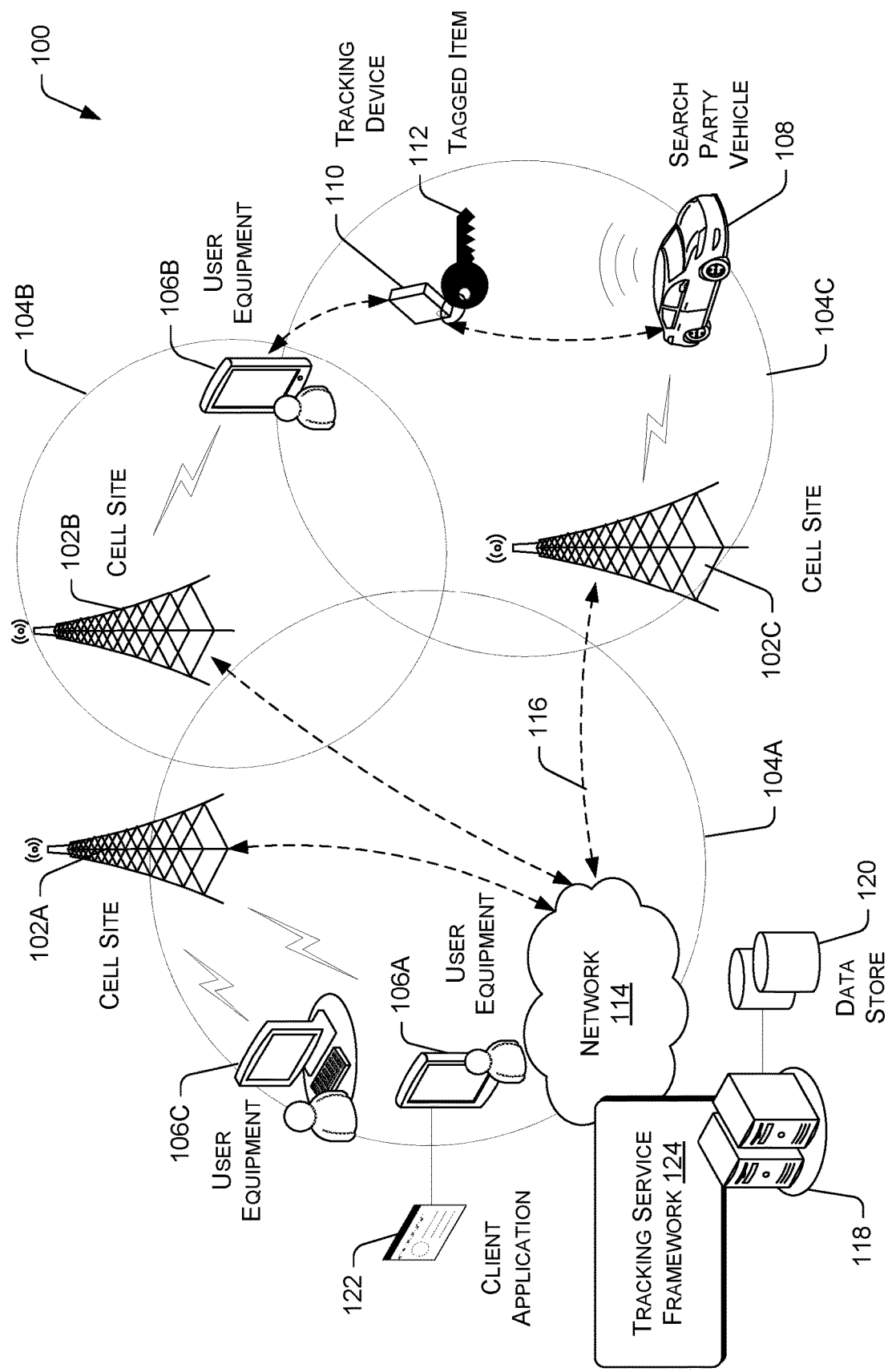
FIG. 1 illustrates example network architecture for implementing a tracking service framework utilizing a plurality of user equipment comprising Bluetooth listening devices operated by customers and non-customers of a telecommunications service provider.

This disclosure is directed to techniques for tracking an item of interest using a plurality of user equipment that can listen for tracking device signals in a passive manner in order to communicate with a tracking device that is attached to the tracked item. It is noted that the tracking device can comprise various tracking devices that communicate using Bluetooth® wireless technology or other short-range communication techniques. The user equipment (i.e., BLE listening devices) can include a number of network-enabled devices that can be operated by a customer or a non-customer (i.e., a subscriber or a non-subscriber) of a telecommunications service provider. The user equipment can comprise a client application or a program that is configured to track the tracking device. Additionally or alternatively, the user equipment can comprise an application or a program that is configured to run in the background of another application or program to detect signals from a nearby tracking device. The application can comprise a configuration module for pairing a tracking device with a specific user equipment and a user profile. Additionally, the application can enable a user to communicate with the tracking device.

Upon determining that the tracking device is not within a communication range of a first user equipment that is operated by the owner of the tracked item attached to the tracking device, the tracking device can automatically enter into a lost mode to transmit signals to other nearby user equipment. Additionally or alternatively, the first user equipment can trigger an alert or a notification via the client application indicating that the tracked item is lost. One or more nearby user equipment can receive transmitted signals from the tracking device. Upon receiving tracking device signals, the user equipment can transmit its location, and thereby the tracking device's approximate location to the network. Thus, if the location of the tracked item changes, another user equipment can receive tracking device signals and transmit its location, and thereby the tracking device's new approximate location to the network. In this way, the network can keep a track of the tracked item's movements to enable the owner to recover the tracked item.

The tracking device can transmit signals on a scheduled basis or upon detecting nearby devices. Additionally, the tracking device can transmit signals based on location. In various embodiments, the user equipment can be authenticated to configure the tracking device's communication scheme with the user equipment and/or the network and to adjust the tracking device's power settings. In various embodiments, the user equipment may be a fully authenticated device, a semi-authenticated device, or an unauthenticated device. For instance, a fully authenticated user equipment is operated by the owner of the tracking device and is paired with the tracking device. A fully authenticated user equipment can transmit commands to the tracking device to enable one or more functions of the tracking device that can assist the owner to locate the tracking device, and thereby the tracked item. For instance, the tracking device can emit sounds or various visual indicators to draw attention. In various embodiments, the tracking device can transmit messages or notifications to the authenticated user equipment to indicate that it is located nearby.

A semi-authenticated user equipment can comprise dedicated BLE listening devices or specific user equipment. The semi-authenticated user equipment can display a message or emit alerts acknowledging that it has received tracking device signals. In this way, a user of the semi-authenticated user equipment can look for the tracking device nearby. Additionally, the tracking device can slow communication updates upon detecting a semi-authenticated user equipment. If the user equipment is an unauthenticated user equipment, the user equipment may only listen for signals from tracking devices in the background. In this way, the unauthenticated user equipment can help determine the tracking device's location without alerting or notifying a user of the unauthenticated user equipment. The techniques described herein may be implemented in a number of ways. Example implementations are provided below with reference to the following figures.

Example Network Architecture

FIG. 1 illustrates an example architecture 100 for implementing a tracking service framework 124 utilizing a plurality of user equipment 106A-106C comprising Bluetooth listening devices operated by customers and non-customers of a telecommunications service provider. The user equipment 106A-106B comprises smartphones, mobile devices, personal digital assistants (PDAs) or other electronic devices having a wireless communication function that are capable of receiving input, processing the input, and generating output data. The user equipment 106A-106B is connected to a telecommunication network 114 utilizing one or more wireless base stations 102A-102C or any other common wireless or wireline network access technologies.

Additionally, the user equipment 106A-106C can represent any type of consumer devices that can include computing devices (e.g., general-purpose computers) and special purpose-type devices, embedded-type devices, Internet of Things (IoT) devices, wearable-type devices, wearable devices, gaming devices, or entertainment devices such as network-enabled televisions, set-top boxes, media players, cameras, medical devices, appliances, and/or so forth. In the illustrated embodiment, the user equipment can also represent automotive computers such as vehicle control systems of a vehicle 108, the vehicle's 108 vehicle security systems, and/or an electronic key for the vehicle 108, wherein the vehicle 108 can be equipped with a connected car technology for communicating with the network 114.

The base stations 102A-102C can connect to the network 114 via a backhaul link 116 or other distributed portions of the network 114. The base stations 102A-102C provide network coverage in target geographical areas 104A-104C. The backhaul link 116 may be configured to employ any common wireline communication technology, including but not limited to, optical fiber, coaxial cable, twisted pair cable, Ethernet cable, and powerline cable, along with any common wireless communication technology. The network 114 can be a cellular network that implements 2 G, 3 G, 4 G, 5 G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

The network 114 comprises a tracking service framework 124 that can be executed at least partially on a server 118. The server 118 may include general-purpose computers, such as desktop computers, tablet computers, laptop computers, servers (e.g., on-premise servers), or other electronic devices that are capable of receiving input, processing the input, and generating output data. The server 118 may be operated by a telecommunication service provider or a third-party entity that is working with the telecommunication service provider. The server 118 may store data in a distributed storage system, in which data may be stored for long periods of time and replicated to guarantee reliability.

Accordingly, the server 118 may provide data and processing redundancy, in which data processing and data storage may be scaled in response to demand. Further, in a networked deployment, new servers may be added. Thus, the server 118 can include a plurality of physical machines that may be grouped together and presented as a single computing system. Each physical machine of the plurality of physical machines may comprise a node in a cluster. The server 118 may also be in the form of virtual machines, such as virtual engines (VE) and virtual private servers (VPS).

A user of a first user equipment 106A can attach a tracking device 110 or a tracking device to an item of interest such as a key, a purse, a wallet, or another a valuable item. In this way, the user can locate the tagged item 112 by locating the tracking device 110. Without limitation, the tracking device 110 can comprise a transceiver, a sensor, a processor, a memory, a communication interface, and other components for communicating its real-time or near real-time location to the network 114 and/or one or more user equipment 106A-106C. The tracking device 110 can communicate using Bluetooth® wireless technology or other short-range communication techniques. The tracking device 110 can be attached to the tagged item 112 in a number of ways. For example, the tracking device 110 can be attached to the exterior of the tagged item 112 or inserted into or embedded within the tagged item 112. It is noted that the user can be a customer or a non-customer of a telecommunications service provider. Thus, the one or more user equipment 106A-106C can be a customer's device or a non-customer's device.

In the illustrated embodiment, the first user equipment 106A can be paired to the tracking device 110 using a client application 122 installed on the first user equipment 106A. Various pairing methods (e.g., Bluetooth® pairing) may be used. The client application 122 can provide a user interface (e.g., a graphical user interface (GUI)) for setting up and managing a user profile, configuring the tracking device 110, performing a local search for the tracking device 110 (i.e., attached to the tagged item 112), and/or so forth. During the setup process or the configuration process, the user profile can be associated with the tracking device 110. In various embodiments, the user profile can be associated with a plurality of tracking devices, wherein each tracking device 110 can comprise a unique tracking device identifier or a Bluetooth® advertising protocol (i.e., a packet). Additionally, the user profile can be associated with a user and one or more user equipment 106A-106C that comprises a unique identifier. The unique identifier can indicate whether the user equipment 106A-106C is a customer's device or a non-customer's device.

In various embodiments, the GUI of the client application 122 can display a map showing the last known location of the tracking device 110 in order to inform the user of the most recent location of the tagged item 112. Additionally, the client application 122 can provide a location history of the tagged item 112 by displaying the location of the tagged item 112 at different dates and times. In this way, the client application 122 enables the user to track the movement of the tagged item 112 if the tagged item 112 is mobile.

If the tracking device 110 is outside of the communication range of the first user equipment 106A, the tracking device 110 can automatically enter into a lost mode. The lost mode means that the tagged item 112 may be lost, misplaced, or stolen. Additionally or alternatively, the tracking device 110 can automatically enter into the lost mode when it is located outside of a predetermined radius of the first user equipment 106A. When the tracking device 110 enters a lost mode, the user may be notified at the first user equipment 106A via the client application 122. Additionally or alternatively, if the tagged item 112 becomes lost or stolen, the user can manually report that the tagged item 112 is missing, via the client application 122, which can trigger the tracking device 110 to enter into a lost mode. Upon determining that the tracking device 110 is lost, the first user equipment 106A, via the client application 122 can notify the tracking service framework 124 that the tracking device 110 is missing. In response to receiving the notification, the tracking service framework 124 can request one or more user equipment 106B-106C or other listening devices to listen for transmitted signals from the tracking device 110.

In the illustrated embodiment, other listening devices can also include vehicles 108. The nearby user equipment 106B-106C or the vehicle's 108 automotive computer can also comprise the client application 122 installed thereon. Additionally or alternatively, the user equipment 106B-106C and/or the vehicle's 108 automotive computers can include a compatible software application or a program with a background service for passively listening for tracking device signals from nearby tracking devices 110. In this way, the users of the user equipment 106B-106C can help look for the tracking device 110 without actively participating in the search.

The tracking device 110 can transmit signals in accordance with a transmission scheme. The tracking device signals can include tracking device identifiers and the location information (e.g., global positioning system (GPS) coordinates) of the tracking device 110. In various embodiments, the tracking device signals can also include messages such as information related to the first user equipment 106A, contact information of the owner (e.g., name, phone number, address, email, etc.), and/or so forth. When the user equipment 106B-106C and/or other listening devices (e.g., vehicle 108) receive signals from the tracking device 110, the user equipment 106B-106C and/or other listening devices can transmit a message to the tracking service framework 124. The message can include the tracking device identifier of the tracking device 110 and the listening device's information such as its location information, and thereby the tracking device's 110 location. The transmission can be timestamped such that the location information can correspond to different dates and times. In this way, if the tracking device 110 moves to another location, the tracking device's 110 movements can be tracked.

The location information corresponding to the tracking device 110 and/or the one or more user equipment 106B-106C can be stored in a cloud service or a data store 120 that is in communication with the tracking service framework 124. In various embodiments, the data store 120 can comprise a data management layer that includes software utilities for facilitating the acquisition, processing, storing, reporting, and analysis of data from multiple data sources such as the user equipment 106A-106C, the vehicle 108, and/or so forth. In various embodiments, the data store 120 can interface with an API for providing data access. Additionally, the data store 120 can store and maintain user profiles associated with one or more users of the tracking service framework 124.

In various embodiments, the user equipment 106B-106C can transmit a notification to the tracking device 110 in response to detecting the tracking device 110. The notification can indicate that the user equipment 106B-106C is located nearby. Conversely, the tracking device 110 can transmit a notification to the user equipment 106B-106C upon detecting the user equipment 106B-106C. Additionally, the user equipment 106B-106C can transmit one or more messages to the tracking device 110 in response to receiving tracking device signals, wherein the messages can include commands. The user equipment 106B-106C and the tracking device 110 can communicate based at least partially on the authentication level associated with the user equipment 106B-106C. The user equipment 106B-106C and/or other listening devices can be fully authenticated, semi-authenticated, or unauthenticated. In this regard, the tracking service framework 124 may use an authentication mechanism. For example, the authentication mechanism may validate a user equipment as a fully authenticated device, a semi-authenticated device, or an unauthenticated device based one or more authentication credentials. For example, the authentication credentials can include a unique identifier of the user equipment. The authentication credentials can be compared against a list of user equipment in the data store 120 or another database (e.g., subscriber database, whitelist, blacklist, database of device capabilities, access control list (ACL), etc.). Each user equipment in the data store 120 can be associated with an authentication level.

A fully authenticated device is a user equipment that is operated by an owner of a tracking device that is attached to a tagged item, and that is paired with the tracking device. Thus, in the illustrated embodiment, the first user equipment 106A can be fully authenticated, wherein the first user equipment 106A can be operated by the owner of the tagged item 112 that is attached to the tracking device 110. The fully authenticated user equipment 106A can emit audible sounds (e.g., beeps), provide tactile notifications (e.g., vibrations), and/or display visual indicators (e.g., flashing lights) to alert the user when the tracking device 110 is in a lost mode and is located nearby. The fully authenticated user equipment 106A can also send secure messages or commands and retrieve data (e.g., location information) from the tracking device 110. Upon communicating with the fully authenticated user equipment 106A or receiving an acknowledgment from the user equipment 106A, the tracking device 110 can minimize communication over the network 114.

The semi-authenticated user equipment can be limited to specific types of equipment such as BLE listeners or other dedicated listening devices. For instance, user equipment 106B-106C that comprises smartphones can be semi-authenticated while vehicles 108 equipped with a connected car technology may not be semi-authenticated. It is noted that semi-authenticated user equipment may not be operated by the owner of the tracking device 110. Therefore, the semi-authenticated user equipment may not be operated by the owner of the tagged item 112. If the user equipment 106B-106C is semi-authenticated, the user equipment can acknowledge that it has received tracking device signals. In this regard, the user equipment 106B-106C can emit alerts, provide tactile notifications, and/or display notifications or messages. Additionally, the tracking device 110 can slow communication updates upon detecting a semi-authenticated user equipment.

The unauthenticated user equipment can be limited to user equipment comprising specific software applications installed thereon. For example, an unauthenticated user equipment can comprise a smartphone with an application that is configured to provide background BLE listening. If the user equipment 106B-106C is not authenticated, the user equipment 106B-106C does not acknowledge that it has received tracking device signals. Thus, the user of the user equipment 106B-106C can unknowingly help locate the tagged item 112 by transmitting its location information, and thereby the location information of the tracking device 110 in the background while it is in the vicinity of the tracking device 110. When transmitting tracking device signals to the unauthenticated user equipment 106B-106C, the tracking device 110 can receive notifications from the tracking service framework 124 that it was recently heard to enter into a semi-slow update mode.

If there are no nearby user equipment 106B-106C, the tracking device 110 can continue transmitting tracking device signals. Additionally or alternatively, the tracking device 110 can transmit tracking device signals only when it detects the presence of a user equipment 106B-106C in its vicinity in order to conserve its battery power. In various embodiments, the tracking device 110 can provide a transmission scheme such that the communication rate can be slowed when no motion is detected, or based on time of the day or location. Additionally, the tracking device 110 can prioritize communication with certain devices. For instance, the tracking device 110 can transmit tracking device signals to smartphones 106B-106C before transmitting signals to vehicles 108.

Upon receiving location information corresponding to the tracking device 110, the tracking service framework 124 is configured to pass on the location information of the tracking device 110 to the user equipment 106A that is associated with the tracking device 110. More particularly, the tracking service framework 124 can identify the user equipment 106A that is associated with the tracking device 110 by referencing the user profile that includes the tracking device identifier and the unique identifier of the user equipment 106. The user can use the location information to recover the tagged item 112. When the tagged item 112 is recovered, the user equipment 106A can indicate via the client application 122 that the tagged item 112 is recovered. This process can trigger the tracking device 110 to enter into a normal mode. The normal mode means that the tagged item 112 may not be lost, misplaced, or stolen.

Example Computing Device Components

Figure 2:
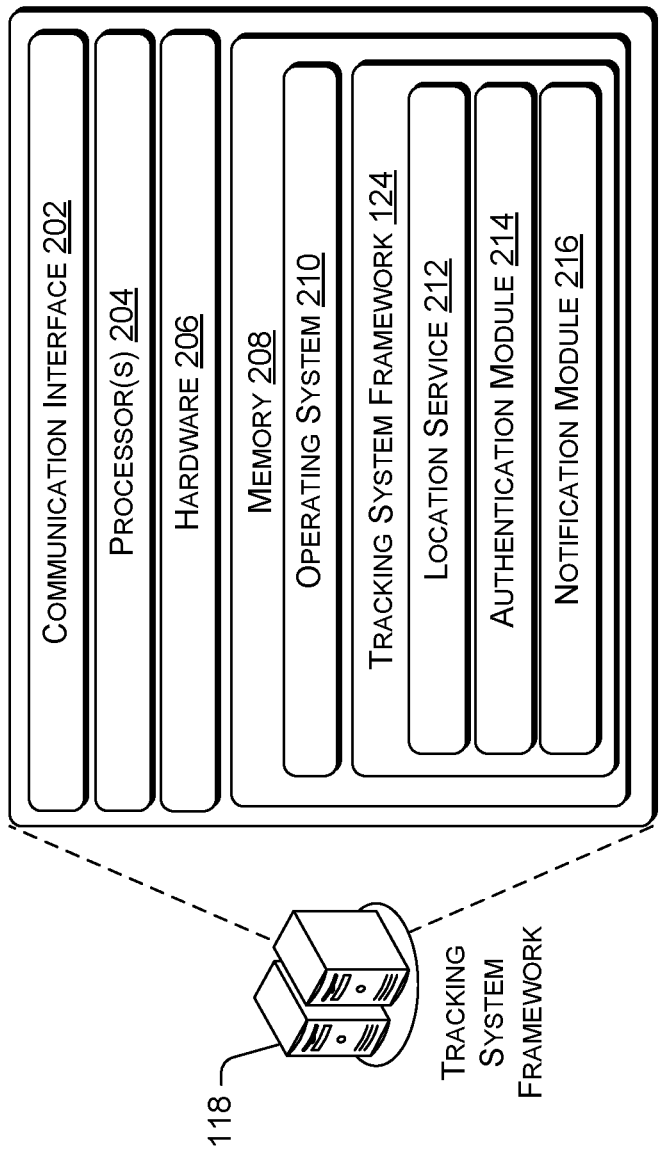
FIG. 2 is a block diagram showing various components of an illustrative computing device that implements a tracking service framework.

FIG. 2 is a block diagram showing various components of an illustrative computing device, wherein the computing device can comprise a server 118. It is noted that the server 118 as described herein can operate with more or fewer of the components shown herein. Additionally, the server 118 as shown herein or portions thereof can serve as a representation of one or more of the computing devices of the present system.

The server 118 may include a communication interface 202, one or more processors 204, hardware 206, and memory 208. The communication interface 202 may include wireless and/or wired communication components that enable server 118 to transmit data to and receive data from other networked devices. In at least one example, the one or more processor(s) 204 may be a central processing unit(s) (CPU), graphics processing unit(s) (GPU), both a CPU and GPU, or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the server 118.

The processors 204 and the memory 208 of the server 118 may implement an operating system 210 and a tracking system framework 124. The tracking system framework 124 includes a location service 212, an authentication module 214, and a notification module 216. The operating system 210 may include components that enable the server 118 to receive and transmit data via various interfaces (e.g., user controls, a communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The location service 212 is configured to determine the real-time or near real-time location of the tracking device and one or more user equipment. In various embodiments, the location information can be obtained using network-based techniques, handset-based techniques, subscriber identity module (SIM) based techniques, WiFi techniques, and/or so forth. Additionally, the location information can be obtained using GPS. The location information can be a crowdsourced information and/or retrieved from a dedicated listening device.

The authentication module 214 is configured to determine the authentication level that is associated with the user equipment in communication with the tracking device. In various embodiments, the user equipment can be fully authenticated, semi-authenticated, or unauthenticated following authentication of one or more authentication credentials, wherein the authentication credentials can include a unique identifier of the user equipment. The unique identifier of the user equipment can include the international mobile subscriber identity (IMSI), embedded subscriber identity module (SIM) identification (EID), and/or so forth. In various embodiments, a user equipment can request authentication of one or more user equipment during the setup process or the configuration process of a user profile. The authentication level of the user equipment can be stored in a data store. The data store can comprise a list of user equipment and the authentication level that is associated with the user equipment. In various embodiments, the data store can comprise a subscriber database, whitelist, blacklist, database of device capabilities, ACL, and/or so forth. Based at least partially on the authentication level that is associated with the user equipment, the tracking device can configure the type and frequency of the communication between the user equipment and/or the network. For instance, the tracking device can transmit data to and receive commands from a fully authenticated user equipment.

The notification module 216 is configured to push notifications to the user equipment and/or the tracking device. Various protocols for providing push notifications may be implemented. For example, the notification module 218 can provide notifications, alerts, or messages to a user equipment indicating the last known location of the tracking device. In another example, the notification module 218 can provide notifications, alerts, or messages to a user equipment indicating that the tracking device is in the vicinity of the user equipment. Additionally, the notification module 218 can facilitate communication between one or more user equipment and the tracking device.

Example Workflow

Figure 3:
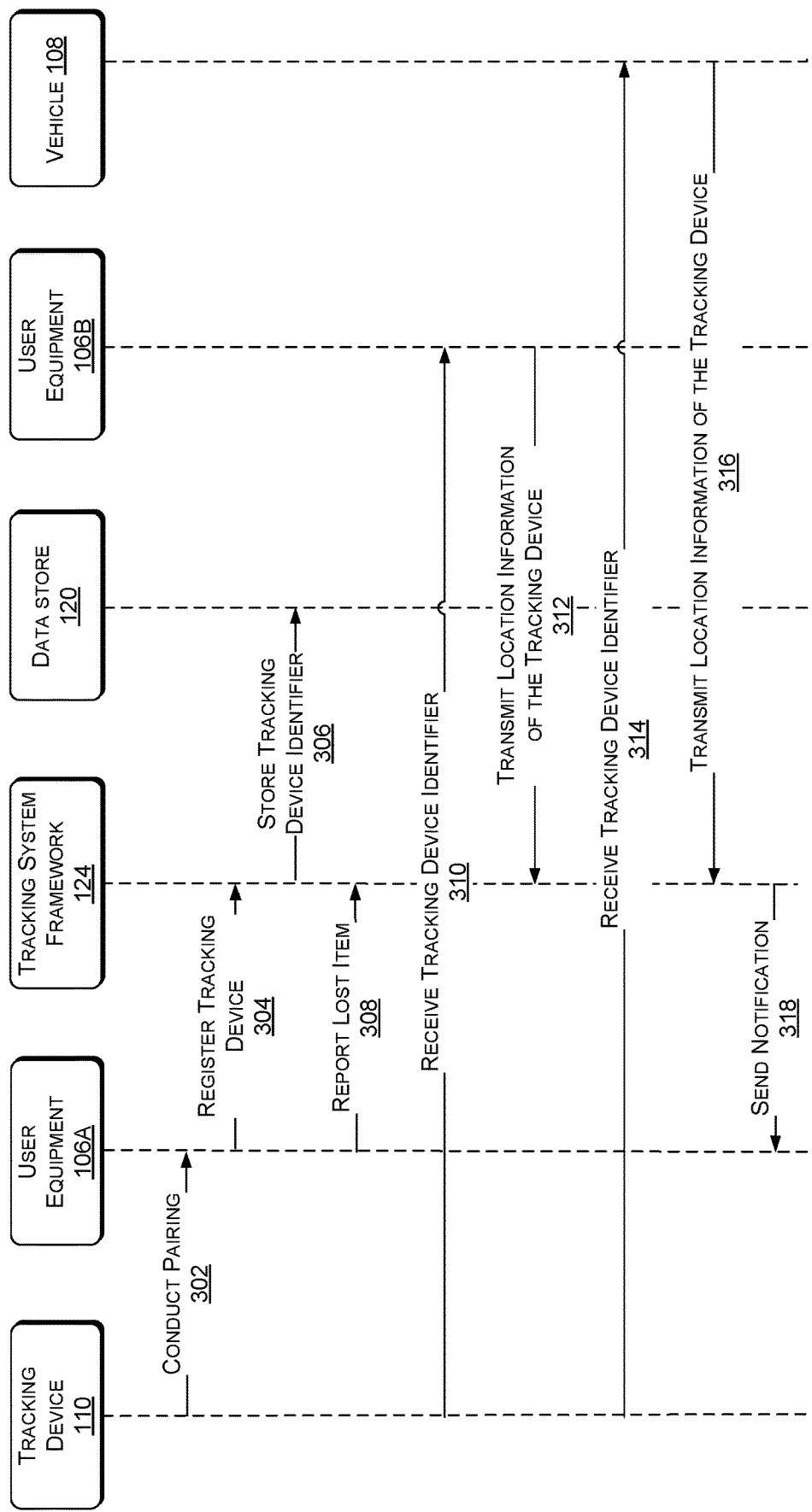
FIG. 3 is a flow diagram of an example process for tracking the location of a tracking device utilizing various user equipment in communication with a telecommunications network.

FIG. 3 is a flow diagram of an example process for tracking the location of a tracking device utilizing various user equipment in communication with a telecommunications network. Each tracking device 110 can be paired 302 to a specific user equipment, such as a first user equipment 106A that is operated by the owner of the tracking device 110. In various embodiments, the pairing can be facilitated via a client application that is installed on the first user equipment. During the pairing process, the first user equipment 106A, via the client application, can transmit tracking device information 304 to the tracking system framework 124 at the network. The tracking device information can include a unique tracking device identifier that corresponds to the tracking device 110. The tracking system framework 124 at the network can store the tracking device identifier 306 at the data store 120. Additionally, the tracking system framework 124 can store information related to the first user equipment at the data store 120. If the first user equipment 106A reports a lost item 308 to the network, the tracking system framework 124 can trigger one or more user equipment to listen for tracking device signals.

Upon receiving tracking device signals 310 from the tracking device 110, a second user equipment 106B can transmit its location information, and thereby the approximate location information of the tracking device 312. The second user equipment 106B can be mobile such that it moves in and out of the communication range of the tracking device 110. If the second user equipment 106B is out of the communication range of the tracking device 110, another user equipment that is within the communication range of the tracking device 110 can receive tracking device signals 314 from the tracking device 110. In the illustrated embodiment, a vehicle 108 that is within the communication range of the tracking device 110 can receive tracking device signals 314 from the tracking device 110. Upon receiving the signals, the vehicle 108 can transmit its location information, and thereby the location information of the tracking device 316 to the network. The location information received from the second user equipment 106B and the vehicle 108 can be timestamped. Upon receiving location information from one or more user equipment or vehicles, the network can transmit a notification 318 to the first user equipment 106A. The notification can include the most updated location information of the tracking device 110. In this way, the user of the first user equipment 106A can recover the tracking device 110 and thereby the tagged item at the most updated location.

Example Processes

FIGS. 4 through 7 present illustrative processes 400-700 for locating target items using a network comprising a plurality of user equipment and determining authentication levels associated with the user equipment. The processes 400-700 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to FIGS. 1-3.

Figure 4:
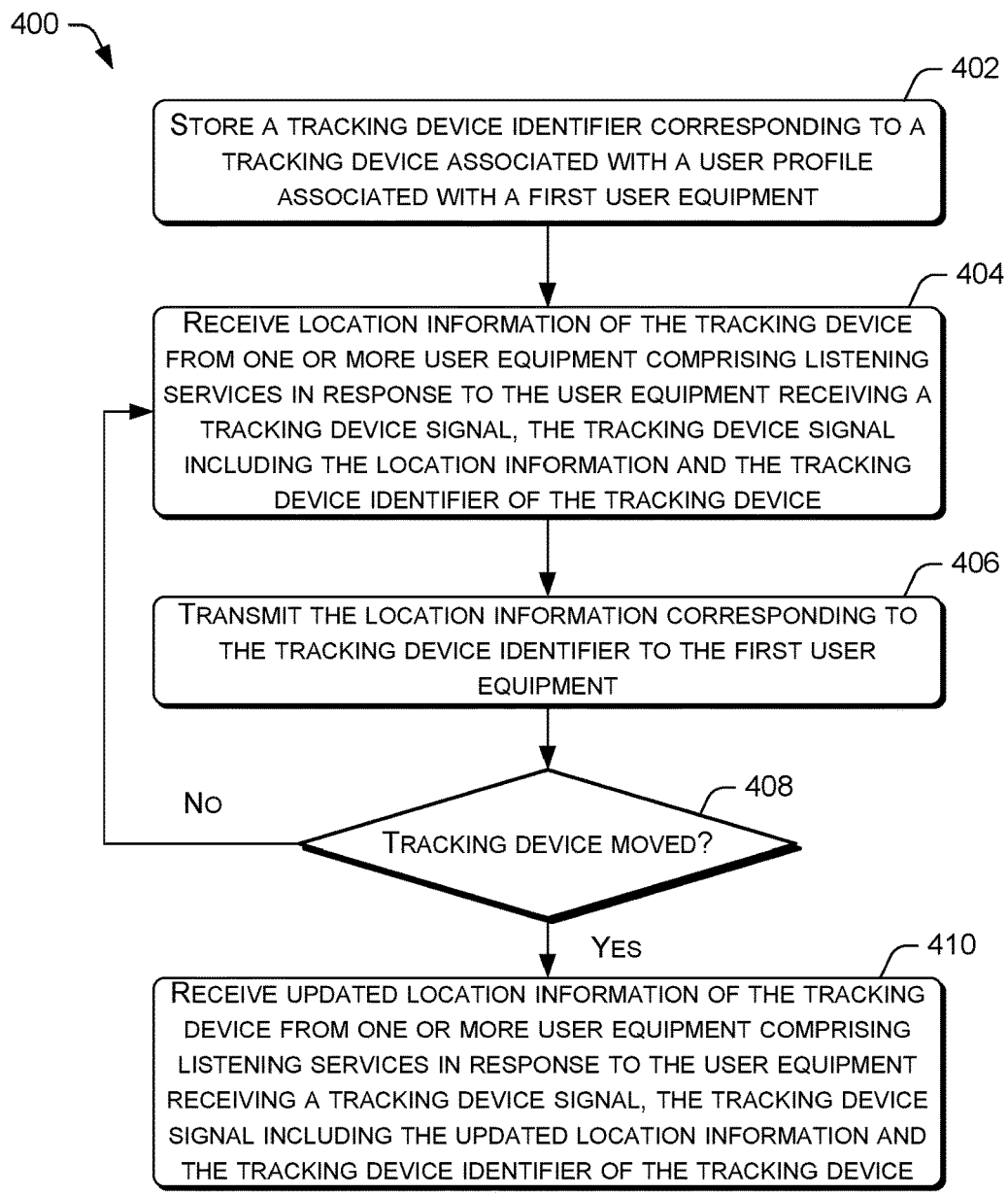
FIG. 4 is a flow diagram of an example process to recover a lost target item from the perspective of a server that implements a tracking service framework.

FIG. 4 is a flow diagram of an example process for finding a lost target item from a perspective of a server located at a tracking service framework, wherein the server is configured to execute a tracking system framework. At block 402, the server can store a tracking device identifier corresponding to a tracking device associated with a user profile associated with a first user equipment. In this regard, the server can register a tracking device in a database upon receiving a registration request from a user equipment, wherein the request can include the tracking device identifier. The tracking device can be attached to a target item to enable a user to track the location of the target item by tracking the location of the tracking device.

At block 404, the server receives, from one or more user equipment, location information corresponding to the tracking device identifier. The location information can include the locations and times the tracking device signals were received at the one or more user equipment. The one or more user equipment comprises listening services enabled thereon. The listening services can be provided via a client application that is installed on the user equipment. The user equipment can include a variety of user equipment as well as network-enabled electronic devices and vehicles equipped with a connected car technology.

At block 406, the server transmits the location information corresponding to the tracking device identifier to the first user equipment that is associated with a user profile correlated with the tracking device identifier. At decision block 408, the server determines whether the tracking device moved to different location. If the tracking device moved to a different location ("yes" response from the decision block 408), the server receives updated location information of the tracking device from one or more user equipment in response to the user equipment receiving a tracking device signal, the tracking device signal including the updated location information and the tracking device identifier of the tracking device, as indicated in block 410. If the tracking device did not move to a different location ("no" response from the decision block 408), the server continues receiving location information of the tracking device from one or more user equipment to transmit to the first user equipment, as indicated in the blocks 404 and 406. This process continues until the tracking device, and thereby the tagged item is recovered.

Figure 5:
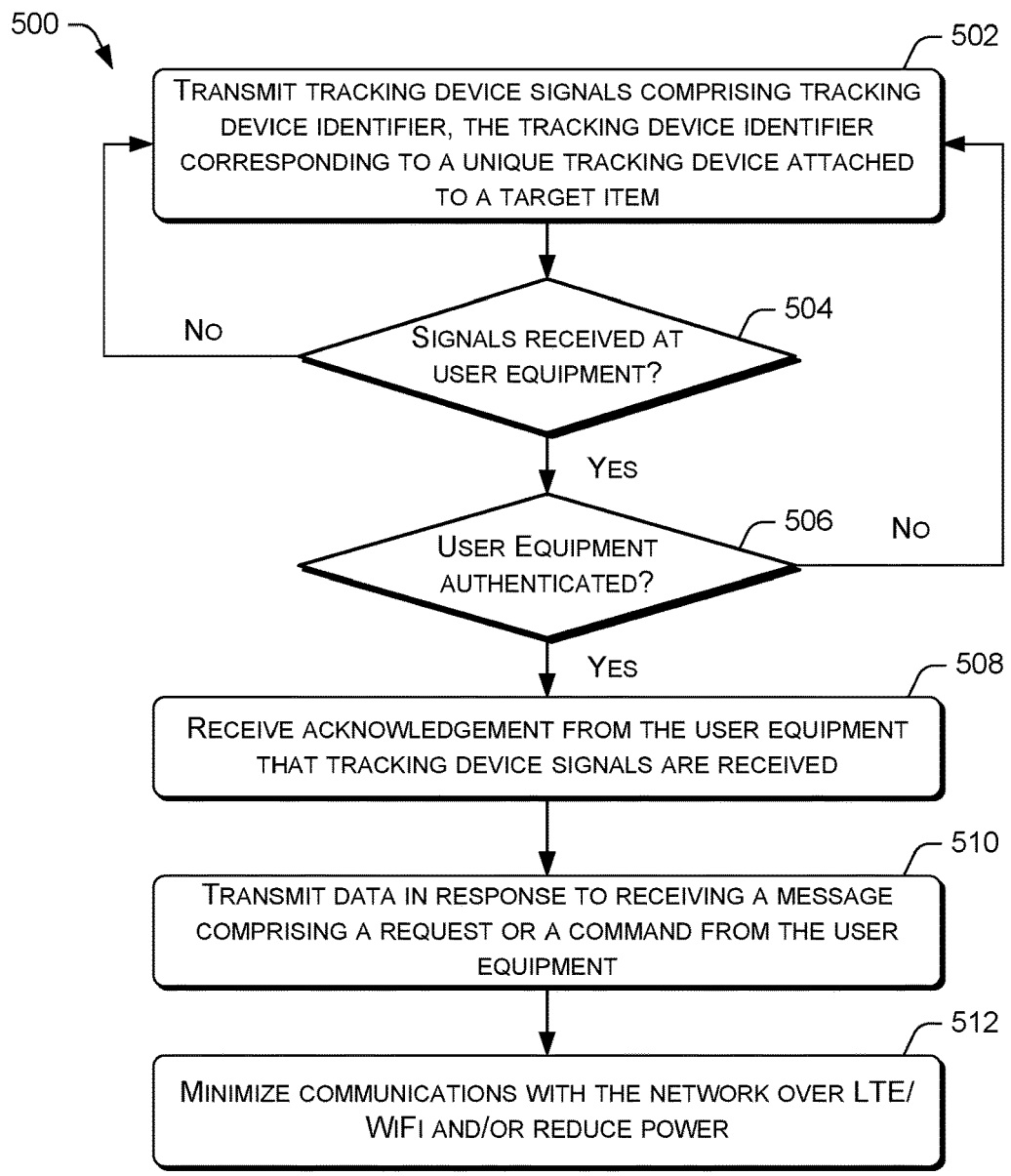
FIG. 5 is a flow diagram of an example process to communicate with an authenticated user equipment from a perspective of a tracking device.

FIG. 5 is a flow diagram of an example process for communicating with an authenticated user equipment from a perspective of a tracking device. At block 502, the tracking device transmits tracking device signals comprising a tracking device identifier, the tracking device identifier corresponding to a unique tracking device attached to a target item. At decision block 504, the tracking device determines whether the signals are received at a user equipment. If the signals are received at the user equipment ("yes" response from the decision block 504), the tracking device determines whether the user equipment is authenticated, as indicated in decision block 506. If the signals are not received ("no" response from the decision block 504), the tracking device continues transmitting tracking device signals as indicated in block 502.

If the user equipment is fully authenticated ("yes" response from the decision block 506), the tracking device receives an acknowledgment from the user equipment that tracking device signals are received, as indicated in block 508. If the user equipment is not authenticated ("no" response from the decision block 506), the tracking device can continue transmitting tracking device signals as indicated in block 502. At block 510, the tracking device transmits data upon receiving a message comprising a request or a command from the user equipment. In various embodiments, the tracking device can enable one or more of its functions upon receiving a command from the user equipment. At block 512, the tracking device minimizes communications with the network over LTE/WiFi and/or reduces power in response to communicating with the user equipment.

Figure 6:
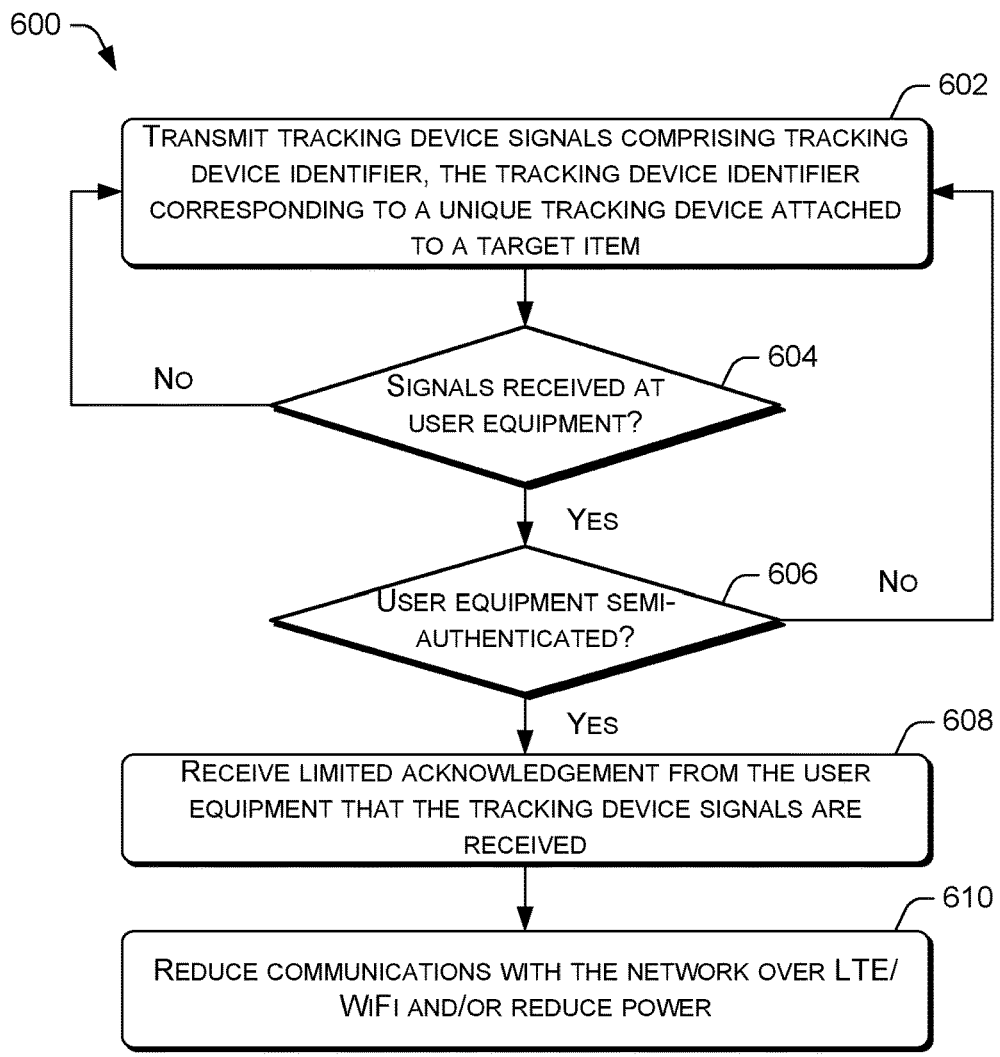
FIG. 6 is a flow diagram of an example process to communicate with a semi-authenticated user equipment from a perspective of a tracking device.

FIG. 6 is a flow diagram of an example process for communicating with a semi-authenticated user equipment from a perspective of a tracking device. At block 602, the tracking device transmits tracking device signals comprising a tracking device identifier, the tracking device identifier corresponding to a unique tracking device attached to a target item. At decision block 604, the tracking device determines whether the signals are received at a user equipment. If the signals are received at the user equipment ("yes" response from the decision block 604), the tracking device determines whether the user equipment is semi-authenticated, as indicated in decision block 606. If the signals are not received ("no" response from the decision block 604), the tracking device continues transmitting tracking device signals as indicated in block 602.

If the user equipment is semi-authenticated ("yes" response from the decision block 606), the tracking device receives a limited acknowledgment from the user equipment that the tracking device signals are received as indicated in block 608. If the user equipment is not semi-authenticated ("no" response from the decision block 606), the tracking device can continue transmitting tracking device signals as indicated in block 602. At block 610, the tracking device reduces communications with the network over LTE/WiFi and/or reduces power in response to communicating with the user equipment.

Figure 7:
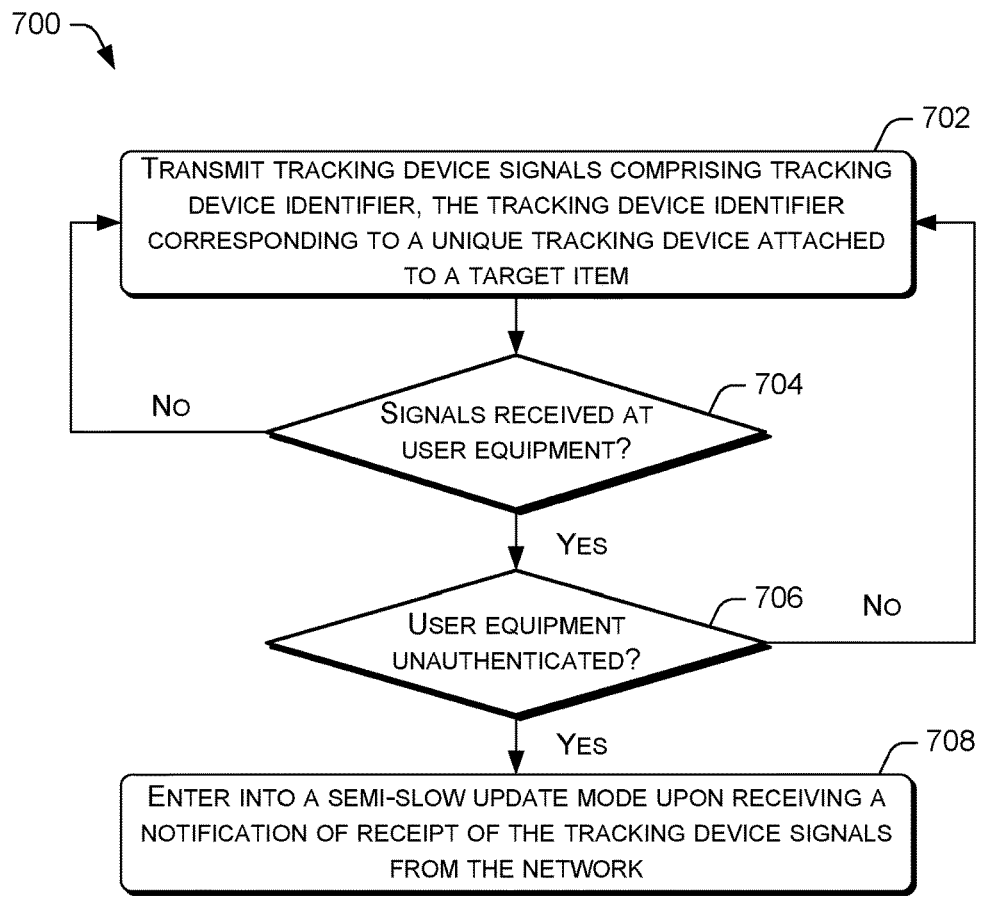
FIG. 7 is a flow diagram of an example process to communicate with an unauthenticated user equipment from a perspective of a tracking device.

FIG. 7 is a flow diagram of an example process for communicating with an unauthenticated user equipment from a perspective of a tracking device. At block 702, the tracking device transmits tracking device signals comprising a tracking device identifier, the tracking device identifier corresponding to a unique tracking device attached to a target item. At decision block 704, the tracking device determines whether the signals are received at a user equipment. If the signals are received at the user equipment ("yes" response from the decision block 704), the tracking device determines whether the device is unauthenticated as indicated in decision block 706. If the signals are not received ("no" response from the decision block 704), the tracking device continues transmitting tracking device signals. If the user equipment is unauthenticated ("yes" response from the decision block 706), the tracking device enters into a semi-slow update mode upon receiving a notification of receipt of the tracking device signals from the network, as indicated in block 708. If the user equipment is not unauthenticated, the tracking device can continue transmitting tracking device signals as indicated in block 702.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   storing a unique tracking device identifier corresponding to a tracking device associated with a first user equipment;
   receiving location information of the tracking device from a second user equipment in response to the second user equipment receiving a tracking device signal transmitted by the tracking device, the tracking device signal comprising the location information of the tracking device and the unique tracking device identifier corresponding to the tracking device;
   determining an authentication level associated with the second user equipment based at least on whether the second user equipment is associated with a subscriber or a non-subscriber of a telecommunications service provider;
   establishing communication between the second user equipment and the tracking device based at least on the authentication level associated with the second user equipment;
   adjusting a frequency of the communication based at least on the authentication level associated with the second user equipment; and
   transmitting the location information of the tracking device to the first user equipment.

2. The one or more non-transitory computer-readable media of claim 1, wherein the acts further comprise:
   receiving updated location information of the tracking device from a third user equipment in response to the third user equipment receiving the tracking device signal transmitted by the tracking device;

determining an additional authentication level associated with the third user equipment based at least on whether the third user equipment is associated with an additional subscriber or an additional non-subscriber of the telecommunications service provider;

establishing a communication between the third user equipment and the tracking device based at least on the additional authentication level associated with the third user equipment, the authentication level indicating that the second user equipment is fully authenticated and the additional authentication level indicating that the third user equipment is semi-authenticated;

adjusting an additional frequency of the communication such that the tracking device communicates more frequently with the second user equipment compared to the third user equipment; and transmitting the updated location information of the tracking device to the first user equipment.

3. The one or more non-transitory computer-readable media of claim 1, wherein the location information is time stamped.

4. The one or more non-transitory computer-readable media of claim 1, wherein the acts further comprise:
transmitting a message to the tracking device from the second user equipment upon determining that the second user equipment is fully authenticated.

5. The one or more non-transitory computer-readable media of claim 1, wherein the acts further comprise:
transmitting a message to the second user equipment indicating that the second user equipment is within a communication range of the tracking device upon determining that the second user equipment is fully authenticated.

6. The one or more non-transitory computer-readable media of claim 1, wherein the acts further comprise:
transmitting a message to the tracking device indicating that tracking device signal is received at the second user equipment upon determining that the second user equipment is semi-authenticated.

7. The one or more non-transitory computer-readable media of claim 6, wherein the message is transmitted to the tracking device on a scheduled basis.

8. The one or more non-transitory computer-readable media of claim 1, wherein the acts further comprise:
transmitting a message to the tracking device indicating that the tracking device signal is received at the second user equipment upon determining that the second user equipment is unauthenticated.

9. A computer-implemented method, comprising:
storing a unique tracking device identifier corresponding to a tracking device paired with a first user equipment;
receiving location information of the tracking device from a second user equipment when the tracking device is located within a predetermined radius of the second user equipment, the tracking device signal comprising the location information of the tracking device and the unique tracking device identifier;
determining an authentication level associated with the second user equipment based at least on whether the second user equipment is associated with a subscriber or a non-subscriber of a telecommunications service provider;
establishing communication between the second user equipment and the tracking device based at least on the authentication level associated with the second user equipment;
adjusting a frequency of the communication based at least on the authentication level associated with the second user equipment; and
transmitting the location information of the tracking device to the first user equipment.

10. The computer-implemented method of claim 9, further comprising:
receiving an updated location information of the tracking device from a third user equipment;
authenticating the third user equipment to establish communication between the third user equipment and the tracking device; and
transmitting the updated location information of the tracking device to the first user equipment.

11. The computer-implemented method of claim 10, wherein the second user equipment is not within a communication range of the tracking device.

12. The computer-implemented method of claim 10, wherein the location information and the updated location information of the tracking device are time stamped, further comprising:
tracking movement of the tracking device based on the time stamped location information and the time stamped updated location information.

13. The computer-implemented method of claim 9, further comprising:
transmitting a message to the tracking device from the first user equipment to the tracking device when the tracking device is located within the predetermined radius of the first user equipment and the first user equipment is fully authenticated.

14. The computer-implemented method of claim 9, further comprising:
transmitting a message to the first user equipment when the tracking device is located within the predetermined radius of the first user equipment.

15. The computer-implemented method of claim 9, further comprising:
transmitting a message to the tracking device indicating that tracking device signal is received at the second user equipment upon determining that the second user equipment is semi-authenticated.

16. The computer-implemented method of claim 9, wherein the second user equipment is a Bluetooth Low Energy (BLE) listening device.

17. The computer-implemented method of claim 9, further comprising:
transmitting a message to the tracking device indicating that the tracking device signal is received at the second user equipment upon determining that the second user equipment is unauthenticated.

18. A system, comprising:
one or more non-transitory storage mediums configured to provide stored code segments, the one or more non-transitory storage mediums coupled to one or more processors, each configured to execute the code segments and causing the one or more processors to:
store a unique tracking device identifier corresponding to a tracking device associated with a first user equipment;
receive location information of the tracking device from a second user equipment when the tracking device is lost, the tracking device signals comprising the location information of the tracking device and the unique tracking device identifier;
determine an authentication level associated with the second user equipment based at least on whether the second user equipment is associated with a subscriber or a non-subscriber of a telecommunications service provider;

establish communication between the second user equipment and the tracking device based at least on the authentication level associated with the second user equipment adjust a frequency of the communication based at least on the authentication level associated with the second user equipment; and transmit the location information of the tracking device to the first user equipment.

19. The system of claim 18, wherein the one or more processors are further configured to:

receive updated location information of the tracking device from a third user equipment when the second user equipment is not within a communication range of the tracking device;

authenticate the third user equipment to establish communication between the third user equipment and the tracking device; and transmit the updated location information of the tracking device to the first user equipment.

20. The system of claim 18, wherein the second user equipment is a fully authenticated listening device or a semi-authenticated listening device.

* * * * *